Aug. 8, 1967
G. R. FELLERS
3,334,438
AERATED MINNOW BUCKET
Filed March 22, 1965
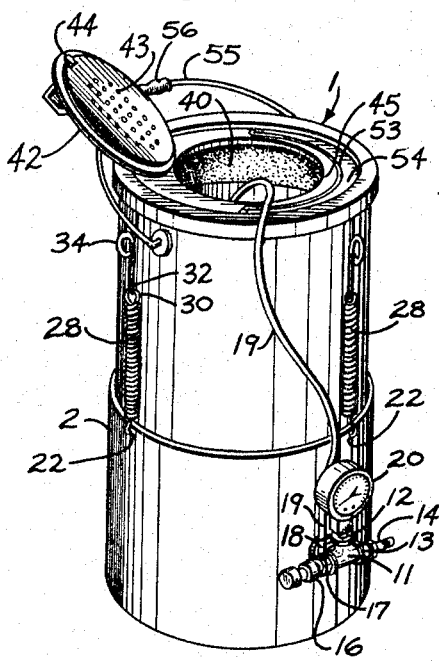
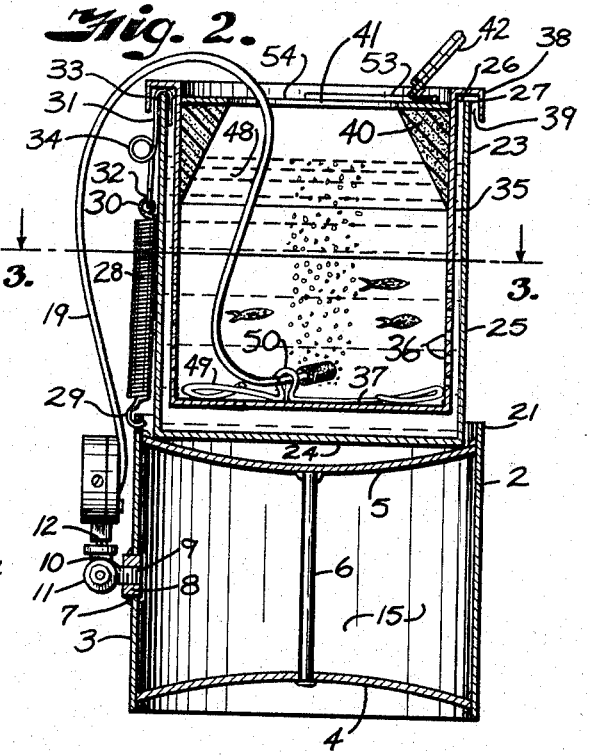
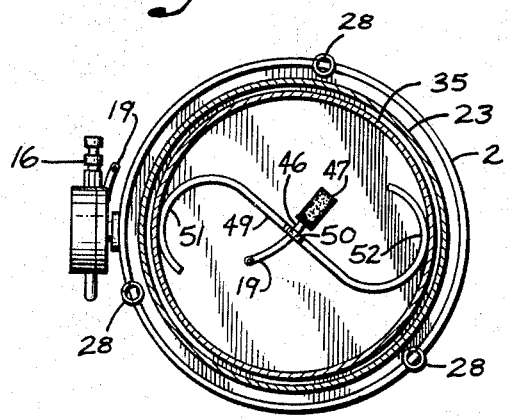
INVENTOR.
Gilbert R. Fellers
BY
Fishburn & Gold
ATTORNEYS

United States Patent Office 3,334,438
Patented Aug. 8, 1967

3,334,438
AERATED MINNOW BUCKET
Gilbert R. Fellers, c/o Fellers Supply Co., 524 Parklane,
P.O. Box 456, Pratt, Kans. 67124
Filed Mar. 22, 1965, Ser. No. 441,644
8 Claims. (Cl. 43—56)

ABSTRACT OF THE DISCLOSURE

An apparatus for prolonging the life of minnows and the like, and including a container for water for receiving minnows used as bait, said container having an open top with a closure lid mounted thereon. A tank like structure having walls and ends forming a closed pressure chamber for containing a supply of air with an air outlet having a control valve and connected by a flexible tube which extends through the top of the minnow container to a stone aeration member adjacent the bottom of the container for supplying air from the pressure chamber to said container aerating the water therein.

---

Various efforts have been made to devise a minnow bucket and providing the same with air to prolong the life of minnows therein, but no one has devised such a bucket of compact form and wherein the pressure tank is combined with the minnow bucket for easy source of supply.

The principal object, therefore, of the present invention is to provide a combination pressure chamber and minnow bucket of compact form wherein air is supplied to the pressure chamber and fed therefrom to the water in the minnow bucket.

Other objects of the present invention are to provide a housing of substantial strength for containing a supply of air forming a pressure chamber; to provide the pressure chamber with concaved opposing ends; to provide a minnow bucket adapted to rest on one of said concaved ends; to provide a container for containing water; to provide a perforated bucket with annular downward extending flanges on the upper rim thereof to engage over the upper edge of the water container so that water passes from the container into the bucket and vice versa; to provide the perforated container with an opening in the top thereof and a lid therefor; to provide the pressure chamber with an annular flange extending above the concaved end upon which the minnow housing rests; to provide spring-urged means having one end attached to the flange on the pressure chamber and the other engaging over the rim of the container to retain the container firmly on the pressure chamber; to provide the wall of the pressure chamber with an opening in which is welded a plug internally threaded for receiving a nipple end of a T fitting; to provide one end of the T fitting with a valve through which air is supplied to the pressure chamber; to provide the other end of the T fitting with a valve through which air is supplied to the pressure chamber; to provide the other end of the T fitting with a needle valve for regulating flow of air from the pressure chamber; to provide a connection with needle valve having an air outlet to which a flexible tube is connected and runs to the perforated minnow bucket; to provide the free end of the flexible tube with a stone aeration member; to provide means in the bottom of the perforated container for holding the stone aeration member above the bottom of the container; to provide said means so that it may be adjusted to fit containers of different size; to provide the T connection with a pressure gauge, and to provide a device of this character simple and economical to manufacture.

Other objects and advantages of this invention will become apparent from the following description taken in connection with the accompanying drawings wherein are set forth by way of illustration and example certain embodiments of this invention.

FIG. 1 is a perspective view of my invention showing the lid or cover in open position.

FIG. 2 is a vertical cross-sectional view particularly illustrating the structure of the invention.

FIG. 3 is a transverse cross-sectional view particularly illustrating the adjustable means for holding the tube and stone aeration member in the perforated container.

Referring more in detail to the drawings:

1 designates a minnow bucket embodying the features of my invention, consisting of a pressure chamber 2 for air from a source of supply (not shown). The side wall 3 of the container and concaved ends 4 and 5 are made from relatively heavy steel material capable of withstanding 200 pounds pressure. I usually recommend 16 gauge steel and that not over 100 pounds be contained within the chamber. I have found that 80 pounds will last from eight to ten hours in use. The ends 4 and 5 are concave to add strength and are connected by a support such as a rod as indicated at 6 to further strengthen the walls of the compartment.

The side wall 3 is provided with an opening 7 for receiving a plug 8 internally threaded as indicated at 9 for receiving a nipple 10 of a T fitting 11 which also has an outlet 12 from the upper side thereof as illustrated in FIG. 1. The entrance side 13 of the nipple 11 is provided with a valve 14 through which air is supplied to the pressure chamber 2. The other end of the T fitting 11 is provided with a needle valve 16 and includes a connection 17 having an outlet 18 therefrom to which is connected a flexible tube 19. The outlet 12 is provided with a pressure gauge 20 to determine the pressure of the pressure chamber 2.

The wall 3 of the pressure chamber 2 extends above the concaved end 5 providing an annular flange 21 provided with a plurality of spaced openings 22. Seated on the concaved end 5 of the compartment housing 2 is a container 23 having a bottom 24, side 25 and an open top 26 providing a rim 27 thereon. In order to hold the container 23 on the pressure chamber I provide a plurality of coil springs 28 having one end 29 engaging in openings 22 of the flange 21 of the pressure chamber. The other end of the coil spring 28 is provided with a loop or eye 30. Link or hook members 31 are provided having a hook 32 at one end engaging the eye 30 of the coil spring and the other end having a hook 33 engaging over the rim 27 of the container 23. The hook members are provided with coils 34 to add resiliency to the connection of the springs 28 and the combined connection with the container 23 to securely hold the container and pressure chamber together.

A bait or minnow bucket 35 is provided for engaging inside the container 23 and spaced from the walls thereof and has the usual perforated walls 36 and a bottom 37. The upper ends of the walls are turned outwardly and downwardly providing flanges 38 and a space 39 between the wall 36 and the flanges so that the edge 27 of the container 23 will engage in said space and the minnow bucket will rest on said edge 27 with the hooks 33 therebetween. The minnow bucket 23 is provided with a ring of foam plastic material or the like 40 on its upper inner side as shown in FIG. 2 to add buoyancy to the bucket. The bucket has an opening 41 adapted to be closed by a hinged lid or cover 42 having perforations as indicated at 43. The lid has a latch 44 for engaging the rim 45 of the opening 41 as is the usual practice.

The tube 19 is of a length to extend upwardly along the side of the outside of the container 23 and into the minnow bucket through the opening 41 and to near the bottom 37 of the perforated minnow bucket as illustrated in FIG. 2.

The free end 46 of the tube 19 is provided with a stone aeration member 47 through which the air is dissipated over a larger area into the water 48 in the minnow bucket.

In order to retain the stone aeration member 47 in place, I provide an S-shaped supporting or wire member 49 having a loop 50 through which the tube 19 is run before placement of the stone aeration member 47 thereon. The hook portions 51 and 52 of the S-shaped member 49 are flexible but of sufficient rigidity that the member may be adjusted to fit minnow buckets of different diameter and also may be bent to raise the stone aeration member from the bottom 37 if desired.

The minnow bucket 35 is provided with the usual bail as indicated at 53, which is adapted to lie flat on the surface 54 of the top of the minnow bucket. The bail 53 is provided for raising the minnow bucket 35 from the container 23 while the container is secured to the pressure chamber. I also provide a bail 55 attached to the container 23 having a handle portion 56 for carrying or transporting the entire minnow bucket and pressure chamber when fastened together or for carrying the container when it is detached from the pressure chamber.

With the bucket and pressure chamber constructed and assembled as described, air is supplied to the pressure chamber 2 through the valve 14 until the pressure gauge shows the pounds of pressure desired. The needle valve 16 may then be regulated to allow the proper amount of air to be dissipated from the pressure chamber 2 to the water in the minnow bucket 35.

If desired, a perforated plastic container containing ice cubes or the like may be placed on top of the perforated lid 42 so that melting of the ice will trickle through the perforations in the lid into the water 48 to keep the water cool.

It is also contemplated that fastening brackets or clips (not shown) may be secured to the wall 3 of the pressure chamber for securing thereto an air pump (also not shown) which would be readily available for supplying air to the pressure chamber 2 through the valve 14.

If desired, a pop-off valve (not shown) may also be provided to the pressure chamber 2 to insure safety thereof. A regulator valve may be attached to the hose or tube connection to assure constant pressure of air at all times.

It will also be obvious that various forms of minnow buckets may be utilized and having closed walls which do not necessitate containers therearound so that ordinary minnow buckets may be adapted to the top of the air or pressure chamber 2.

It will be obvious from the foregoing that I have provided an improved minnow bucket and air compressor attached thereto which is safe, easily assembled and readily available for use.

It is to be understood that while I have illustrated and described one form of my invention, it is not to be limited to the specific form or arrangement of parts herein described and shown except insofar as such limitations are included in the claims.

What I claim and desire to secure by Letters Patent is:
1. An aerated bait bucket comprising,
 (a) a pressure chamber having a side and end walls, said side wall having an air inlet connection and an air outlet connection,
 (b) a container for water having an open top forming a rim and a bottom resting on one end of the pressure chamber,
 (c) means connected to said pressure chamber and said container retaining said container on said pressure chamber,
 (d) a bucket having perforated side walls and a bottom within said container to allow water to pass from the container into said bucket and having means on its upper end engaging the rim of the container, said bucket having an opening in the top thereof,
 (e) a tube connected to the air outlet connection and extending into said bucket through the opening in the top thereof,
 (f) a stone aspirator on the free end of the tube in said bucket,
 (g) and means engaging on the bottom of said bucket and said tube to suspend said stone spaced from the bottom of the bucket.

2. The combination of claim 1 wherein said last named means is adjustable to fit buckets of different diameter.

3. An aerated bait bucket comprising,
 (a) a pressure chamber having a side and end walls, said side wall having an air inlet connection and an air outlet connection,
 (b) a container for water having an open top forming a rim and a bottom resting on one end of the pressure chamber,
 (c) means including coil springs having one end secured to the pressure chamber and the other ends having connection with the rim of the container for retaining same container on said pressure chamber, said coil springs being spaced around said container,
 (d) a bucket having perforated side walls and a bottom within said container to allow water to pass from the container into said bucket and having means on its upper end engaging the rim of the container, said bucket having an opening in the top thereof,
 (e) a tube connected to the air outlet connection and extending into said bucket through the opening in the top thereof, and
 (f) a stone aspirator on the free end of the tube in said bucket.

4. An aerated bait bucket comprising,
 (a) a pressure chamber having a side and end walls, said side wall having an air inlet connection and an air outlet connection, said ends being concaved and the side wall extending above one of said concaved ends forming an annular flange and said flange having spaced openings therein,
 (b) a container for water having an open top forming a rim and a bottom resting on the concaved end of the pressure chamber having the flange thereon,
 (c) a plurality of coil springs having one end connected to the openings in the flange on said pressure chamber,
 (d) link members having one end attached to the other end of said coil springs and having hooks on the other ends engaging the rim of said container retaining said container on said pressure chamber,
 (e) a bucket having perforated side walls and a bottom within said container to allow water to pass from the container into said bucket and having means on its upper end engaging the rim of the container, said bucket having an opening in the top thereof,
 (f) a tube connected to the air outlet connection of said pressure chamber and extending into said bucket through the opening in the top thereof,
 (g) a stone aspirator on the free end of the tube in said bucket, and
 (h) means engaging on the bottom of said bucket and said tube to suspend said stone spaced from the bottom of the bucket.

5. The combination of claim 4 wherein said last named means is adjustable to fit buckets of different diameter.

6. The combination of claim 5 including means in said outlet connection to regulate flow of air from the pressure chamber to said bucket.

7. An aerated bait bucket comprising,
 (a) a pressure chamber having a side and end walls, said side wall having an air inlet connection and an air outlet connection for supplying air to and discharging the same from the chamber, (b) a container for water for housing the bait having an open top forming a rim and a bottom resting on one end of the pressure chamber,
(c) means connected to said pressure chamber and said container retaining said container on said pressure chamber,
(d) a tube connected to the air outlet connection and extending into said container through the open top thereof for supplying air from the pressure chamber to said container,
(e) and a stone aspirator on the free end of said tube in said container,
(f) means engaging on the bottom of said container and engaging said tube to suspend said stone spaced from the bottom of the container.

8. An aerated bait bucket comprising,
(a) a pressure chamber having a side and end walls, one of said walls having an air inlet connection and an air outlet connection for supplying air to and discharging the same from the chamber,
(b) a container for water for housing bait having an open top forming a rim and a bottom,
(c) a tube connected to the air outlet connection and extending into said container through the open top thereof for supplying air from the pressure chamber to said container,
(d) a stone aspirator on the free end of the tube in the said container,
(e) and means engaging on the bottom of said container and engaging said tube to suspend said stone spaced from the bottom of the container,
(f) and valve means regulating the flow of air from the outlet connection through said tube and stone aspirator.

References Cited
UNITED STATES PATENTS

| | | | |
|---|---|---|---|
| 1,073,353 | 9/1913 | Kraning | 43—57 |
| 1,604,971 | 11/1926 | Churchill et al. | 43—57 |
| 1,616,125 | 2/1927 | Holman | 43—56 |
| 2,159,718 | 5/1939 | Spiner et al. | 43—56 |
| 2,570,684 | 10/1951 | Jackson | 43—57 |
| 2,700,243 | 1/1955 | Johnson | 43—56 |
| 2,777,241 | 1/1957 | Mullins | 43—56 |
| 3,191,337 | 6/1965 | Fant | 43—57 |

SAMUEL KOREN, *Primary Examiner.*

D. J. LEACH, *Assistant Examiner.*